(12) United States Patent
Leenstra et al.

(10) Patent No.: US 10,740,104 B2
(45) Date of Patent: Aug. 11, 2020

(54) TAGGING TARGET BRANCH PREDICTORS WITH CONTEXT WITH INDEX MODIFICATION AND LATE STOP FETCH ON TAG MISMATCH

(71) Applicant: International Business Machines Corporation, Armonk, NY (US)

(72) Inventors: Jentje Leenstra, Bondorf (DE); Nicholas R. Orzol, Austin, TX (US); Christian Zoellin, Austin, TX (US); Michael J. Genden, Austin, TX (US); Robert A. Philhower, Valley Cottage, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 15/998,678

(22) Filed: Aug. 16, 2018

(65) Prior Publication Data
US 2020/0057641 A1    Feb. 20, 2020

(51) Int. Cl.
*G06F 9/38* (2018.01)
*G06F 9/30* (2018.01)

(52) U.S. Cl.
CPC ........ *G06F 9/3806* (2013.01); *G06F 9/30061* (2013.01); *G06F 9/3844* (2013.01); *G06F 9/3861* (2013.01)

(58) Field of Classification Search
None
See application file for complete search history.

(56) References Cited

U.S. PATENT DOCUMENTS

| 5,761,490 | A | 6/1998 | Hunt |
| 5,964,870 | A | 10/1999 | Malizewski |
| 6,658,558 | B1 | 12/2003 | Kahle et al. |
| 6,760,835 | B1 * | 7/2004 | Yu .................. G06F 9/3804 712/205 |
| 7,240,186 | B2 | 7/2007 | Bell et al. |

(Continued)

FOREIGN PATENT DOCUMENTS

CN    102566974 B    *    3/2014

OTHER PUBLICATIONS

'A Comprehensive Analysis of Indirect Branch Prediction' by Oliverio J. Santana et al., ISHPC 2002, LNCS 2327, pp. 133-145, 2002. (Year: 2002).*

(Continued)

*Primary Examiner* — Steven G Snyder
(74) *Attorney, Agent, or Firm* — Cantor Colburn LLP; Bryan Bortnick

(57) ABSTRACT

A processor-implemented method is provided. The processor-implemented includes reading, by a processor, an instruction stream by fetching instructions from an instruction cache of the processor. The processor then executes a branch prediction operation based on a context of the instruction stream and an index when one of the instructions includes a branch instruction. The branch prediction operation output a prediction and a context. The processor then compares the context of the instruction stream and the context from the branch prediction operation to determine whether to execute a stop fetch.

17 Claims, 5 Drawing Sheets

(56) References Cited

U.S. PATENT DOCUMENTS

| | | | | |
|---|---|---|---|---|
| 7,430,657 B2* | 9/2008 | Gat | G06F 9/3844 | 712/240 |
| 7,444,457 B2* | 10/2008 | Jourdan | G06F 9/383 | 711/118 |
| 7,523,298 B2* | 4/2009 | Gschwind | G06F 9/3806 | 712/239 |
| 7,673,122 B1 | 3/2010 | Song et al. | | |
| 7,711,934 B2* | 5/2010 | Kishore | G06F 9/3017 | 712/216 |
| 7,890,735 B2* | 2/2011 | Tran | G06F 9/3822 | 712/215 |
| 8,041,931 B2 | 10/2011 | John et al. | | |
| 8,886,920 B2* | 11/2014 | Olson | G06F 9/3806 | 712/237 |
| 9,015,504 B2* | 4/2015 | Tran | G06F 1/3296 | 713/320 |
| 9,389,869 B2* | 7/2016 | Tran | G06F 9/324 | |
| 9,442,736 B2* | 9/2016 | Eickemeyer | G06F 9/30061 | |
| 9,563,430 B2* | 2/2017 | Bonanno | G06F 9/30058 | |
| 9,858,081 B2* | 1/2018 | Heil | G06F 9/3844 | |
| 9,898,299 B2* | 2/2018 | Bonanno | G06F 9/30058 | |
| 9,921,846 B2* | 3/2018 | Heil | G06F 9/3844 | |
| 10,049,043 B2* | 8/2018 | Greenhalgh | G06F 9/3861 | |
| 10,185,570 B2* | 1/2019 | Bonanno | G06F 9/30058 | |
| 10,185,731 B2* | 1/2019 | Hayenga | G06F 9/3806 | |
| 2002/0073301 A1 | 6/2002 | Kahle et al. | | |
| 2005/0138321 A1* | 6/2005 | Jourdan | G06F 9/383 | 711/212 |
| 2005/0149708 A1* | 7/2005 | Gat | G06F 9/3806 | 712/239 |
| 2005/0240936 A1* | 10/2005 | Jones | G06F 8/4442 | 718/107 |
| 2007/0101110 A1* | 5/2007 | Kishore | G06F 9/3017 | 712/239 |
| 2007/0204137 A1* | 8/2007 | Tran | G06F 9/3861 | 712/214 |
| 2008/0005542 A1* | 1/2008 | Gschwind | G06F 9/3844 | 712/239 |
| 2008/0307209 A1* | 12/2008 | Gschwind | G06F 9/3844 | 712/239 |
| 2009/0172361 A1* | 7/2009 | Holloway | G06F 9/3851 | 712/220 |
| 2010/0299499 A1* | 11/2010 | Golla | G06F 9/3851 | 712/206 |
| 2011/0078425 A1* | 3/2011 | Shah | G06F 9/322 | 712/239 |
| 2011/0099355 A1* | 4/2011 | Tran | G06F 1/324 | 712/217 |
| 2011/0099393 A1* | 4/2011 | Tran | G06F 9/3851 | 713/300 |
| 2012/0290817 A1* | 11/2012 | Olson | G06F 9/3806 | 712/205 |
| 2015/0046682 A1* | 2/2015 | Heil | G06F 9/3844 | 712/205 |
| 2015/0046690 A1* | 2/2015 | Eickemeyer | G06F 9/3844 | 712/239 |
| 2015/0046691 A1* | 2/2015 | Heil | G06F 9/3844 | 712/240 |
| 2015/0268957 A1* | 9/2015 | Bonanno | G06F 9/30058 | 712/239 |
| 2015/0339126 A1* | 11/2015 | Bonanno | G06F 9/30058 | 712/239 |
| 2016/0357669 A1* | 12/2016 | Greenhalgh | G06F 9/3851 | |
| 2017/0123798 A1* | 5/2017 | Friedmann | G06F 9/30072 | |
| 2017/0286421 A1* | 10/2017 | Hayenga | G06F 21/75 | |
| 2017/0322810 A1* | 11/2017 | Navada | G06F 9/3001 | |
| 2018/0067747 A1* | 3/2018 | Bonanno | G06F 9/30058 | |
| 2018/0095766 A1* | 4/2018 | Friedmann | G06F 9/3861 | |
| 2018/0225124 A1* | 8/2018 | Gupta | G06F 9/30076 | |
| 2019/0087347 A1* | 3/2019 | Gschwind | G06F 9/44521 | |
| 2019/0102388 A1* | 4/2019 | Hayenga | G06F 9/3806 | |
| 2019/0166158 A1* | 5/2019 | Grocutt | G06F 9/3861 | |

OTHER PUBLICATIONS

'VPC Prediction: Reducing the Cost of Indirect Branches via Hardware-Based Dynamic Devirtualization' by Hyesoon Kim et al., Mar. 2007 (Updated Sep. 2007). (Year: 2007).*

'Target Prediction for Indirect Jumps' by Po-Yung Chang et al., copyright 1997 by the Association for Computing Machinery, Inc. (Year: 1997).*

"Branch Predictor"; Wikipedia; Retrieved from "https://en.wikipedia.org/w/index.php?title=Branch_predictor&oldid=84650840"7; Jun. 9, 2018; 10 Pages.

* cited by examiner

TAGGING TARGET BRANCH PREDICTORS WITH CONTEXT WITH INDEX MODIFICATION AND LATE STOP FETCH ON TAG MISMATCH

BACKGROUND

The disclosure relates generally to branch predictions, and more specifically, to tagging target branch predictors with context with index modification and late stop fetch on tag mismatch.

In general, branch predictors often share information across contexts (i.e. threads and privilege levels (e.g. user code vs. kernel code)). Sharing information across contexts is often disadvantageous as branches in code can be unrelated and as prediction information created for a branch in one context is unlikely to correctly predict a branch in a different context, which results in mispredictions that cost processor performance and power. The disadvantages of mispredictions are especially apparent for branch target predictions where there is little constructive aliasing between contexts.

SUMMARY

According to one embodiment, a processor-implemented method is provided. The processor-implemented includes reading, by a processor, an instruction stream by fetching instructions from an instruction cache of the processor. The processor then executes a branch prediction operation based on a context of the instruction stream and an index when one of the instructions includes a branch instruction. The branch prediction operation output a prediction and a context. The processor then compares the context of the instruction stream and the context from the branch prediction operation to determine whether to execute a stop fetch.

Additional features and advantages are realized through the techniques of the present disclosure. Other embodiments and aspects, of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

DETAILED DESCRIPTION

Figure 1:
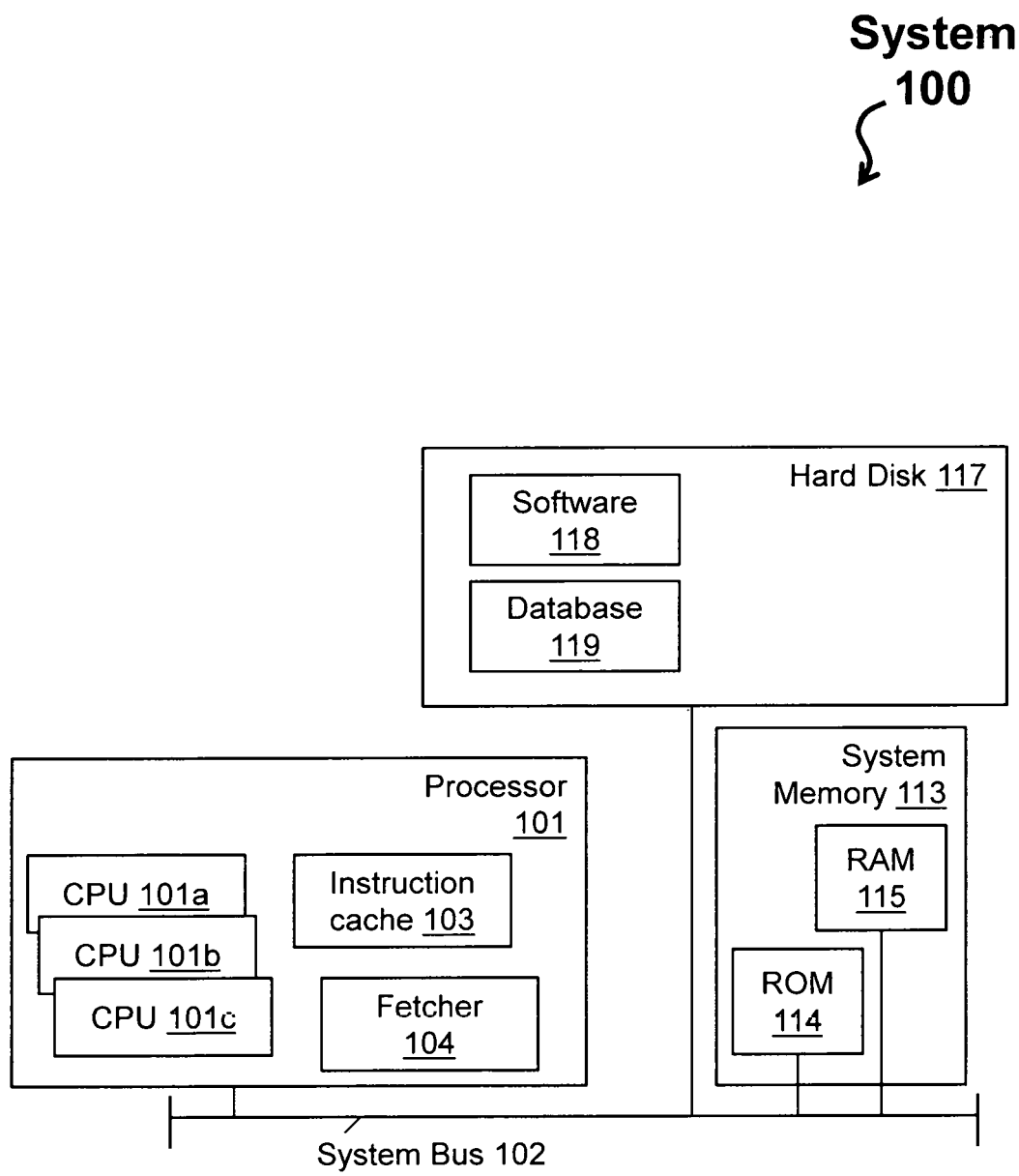
FIG. 1 depicts a processing system in accordance with one or more embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a processor or computing system operates an instruction stream or thread by fetching instructions from an instruction cache. Sometimes, an instruction that is fetched can be a "taken branch" or a "not taken branch." If the fetched instruction is a "taken branch," then the fetched instruction includes a target address and can be referred to as a branch instruction. A sub-category of branch instructions, called indirect branches, include when the target address is not embedded in the fetched instruction itself. Rather, the target address is sourced from a general or special purpose register.

Further, the processor or the computing system utilizes branch predictors in conjunction with fetching the branch instructions from the instruction cache to improve a flow in the instruction stream or thread. An example of a branch predictor is a digital circuit or a table that attempts to guess which way a branch (e.g., an if-then-else structure) will go before this is known definitively. More particularly, branch predictors are utilized to predict whether a particular branch instruction will or will not be taken (regardless of whether a structure of the particular branch instruction is a direct branch or indirect branch). A sub-category of branch predictors, called target branch predictors, is when a particular branch predictor is utilized to predict a target of indirect branches.

Furthermore, at an execution time of the branch instructions (e.g., after fetching), the branch predictors are resolved. Resolving a branch predictor is a determination by the processor or the computing system of whether the predictor was correct at the execution time (e.g., whether a branch was taken or not; and if taken, then what was the target address). Resolving the branch predictors also includes updating the branch predictors. Lastly, the instruction stream is flushed if a branch predictor is found to be incorrect.

Turning now to an overview of the aspects of the invention, one or more embodiments of the invention address incorrect predictions by branch predictors by tagging branch predictors with context information that allows a branch prediction to be ignored if the context information does not match. Context information is data detailing a state of the instruction stream or thread being processed by the processor or the computing system. In accordance with one or more embodiments, context information includes which instruction stream or thread is being processed and what is an associated with privilege level (e.g., user code, kernel, hypervisor, etc.).

For instance, when the processor or the computing system reads a branch predictor to procure a prediction, the processor or the computing system also reads a tag embedded in the branch predictor. The tag includes context information. Thus, the prediction is tagged with "context" so that the processor or the computing system knows "who" (which thread) made the prediction and knows "who" (which thread) is using the prediction. For example, if a prediction is made from Thread 0, then that prediction is only used by Thread 0 and not by other threads on the same processing core. As another example, if a prediction is made from a kernel, then that prediction is only used by the kernel and not by user code. Further, with target branch predictors, the kernel that is doing a branch will have a specific target that would not be very useful to the user code (as it is very likely that the user code is not going to go the same target as the kernel). Thus, the tagging tells the processor or the computing system whether a particular target branch predictor is going to help a particular instruction stream or thread.

The herein-described aspects of the invention address the shortcomings of branch predictors by the processor or the computing system executing a stop-fetch-mismatch mechanism. The stop-fetch-mismatch mechanism includes stopping (holding) fetch operations and waiting for a branch to flush. That is, since the branch was unlikely to predict correctly, it is advantageous to stop fetch and wait for the branch to flush to prevent instructions that were most likely going to be flushed from entering the thread and thus freeing resources and reducing power. In this regard, the stop-fetch-mismatch mechanism uses tagging with context information to increase a likelihood of contention within the branch predictors.

Further, with index modification, part of the context information (i.e., the thread) can be hashed into an index of the branch predictor to reduce contention between the same branches (same effective address) in different contexts. For example, the processor or the computing system is running two threads (i.e., two contexts). Both threads are executing a branch instruction that targets A same entry in a prediction table. Because both threads are executing at a same time and using a same entry, the two threads are going to collide. By using the index modification, both threads occupy different slots in a prediction table so that both threads are no longer crashing into each other. A technical benefit of index modification includes alleviating problems (e.g., collisions) that arise in prior non-tagging cases where context is shared.

Furthermore, embodiments of the stop-fetch-mismatch mechanism described herein are necessarily rooted in the processor or the computing system to perform proactive operations to overcome problems specifically arising in the realm of branch predictors (e.g., these problems include the mispredictions, resulting in unwanted processing performance, power, costs, and expenses). The stop-fetch-mismatch mechanism can be a late stop fetch on a tag mismatch. In this regard, timing is critical and sensitive when the instruction cache is read and the branch prediction is executed by the processor or the computing system. In turn, these operations are performed across multiple clock cycles. The term "late" refers to performing the stop-fetch-mismatch mechanism after an initial prediction.

Embodiments of the invention disclosed herein may include a system, method, and/or computer program product (herein a system) that provide the stop-fetch-mismatch mechanism.

Turning now to FIG. 1, a system 100 for implementing the teachings herein is shown in according to one or more embodiments of the invention. The system 100 can be an electronic, computer framework comprising and/or employing any number and combination of computing device and networks utilizing various communication technologies, as described herein. The system 100 can be easily scalable, extensible, and modular, with the ability to change to different services or reconfigure some features independently of others.

In this embodiment, the system 100 has a processor 101, which can include one or more central processing units (CPUs) 101a, 101b, 101c, etc. and/or processing cores, hypervisors, etc. The processor 101, also referred to as a processing circuit, microprocessor, computing unit, is coupled to a system bus 102. The processor 101 can include an instruction cache 103 and/or a fetcher 104. The instruction cache 103 is a hardware cache used by the processor 101 to reduce an average cost (time or energy) to access data from a system memory 113. The fetcher 104 is utilized by the processor 101 for "fetching" instructions from the instruction cache 103.

The processor 101 is coupled via a system bus 102 to the system memory 113 and various other components. The system memory 113 includes read-only memory (ROM) 114 and random access memory (RAM) 115. The ROM 114 is coupled to the system bus 102 and may include a basic input/output system (BIOS), which controls certain basic functions of the system 100. The RAM is read-write memory coupled to the system bus 102 for use by the processor 101.

The system 100 of FIG. 1 includes a hard disk 117, which is an example of a tangible storage medium readable executable by the processor 101. The hard disk 117 stores software 118 and data 119. The software 118 is stored as instructions for execution on the system 100 by the processor 101. The data 119 includes a set of values of qualitative or quantitative variables organized in various data structures to support and be used by operations of the software 118.

The system 100 of FIG. 1 includes one or more adapters (e.g., hard disk controllers, network adapters, graphics adapters, etc.) that interconnect and support communications between the processor 101, the system memory 113, the hard disk 117, and other components of the system 100 (e.g., peripheral and external devices). In one or more embodiments of the present invention, the one or more adapters can be connected to one or more I/O buses that are connected to the system bus 102 via an intermediate bus bridge, and the one or more I/O buses can utilize common protocols, such as the Peripheral Component Interconnect (PCI).

Thus, as configured in FIG. 1, the operations of the system 100 (such as the process flow of FIG. 2 and the flow schematics of FIGS. 3-5) are necessarily rooted in the computational ability of the processor 101 to overcome and address the herein-described shortcomings of the branch predictors. In this regard, the operations of the system 100 are improved by reducing errors and mispredictions that cause additional processing cycles (thereby increasing the efficiency of the system 100).

Figure 2:
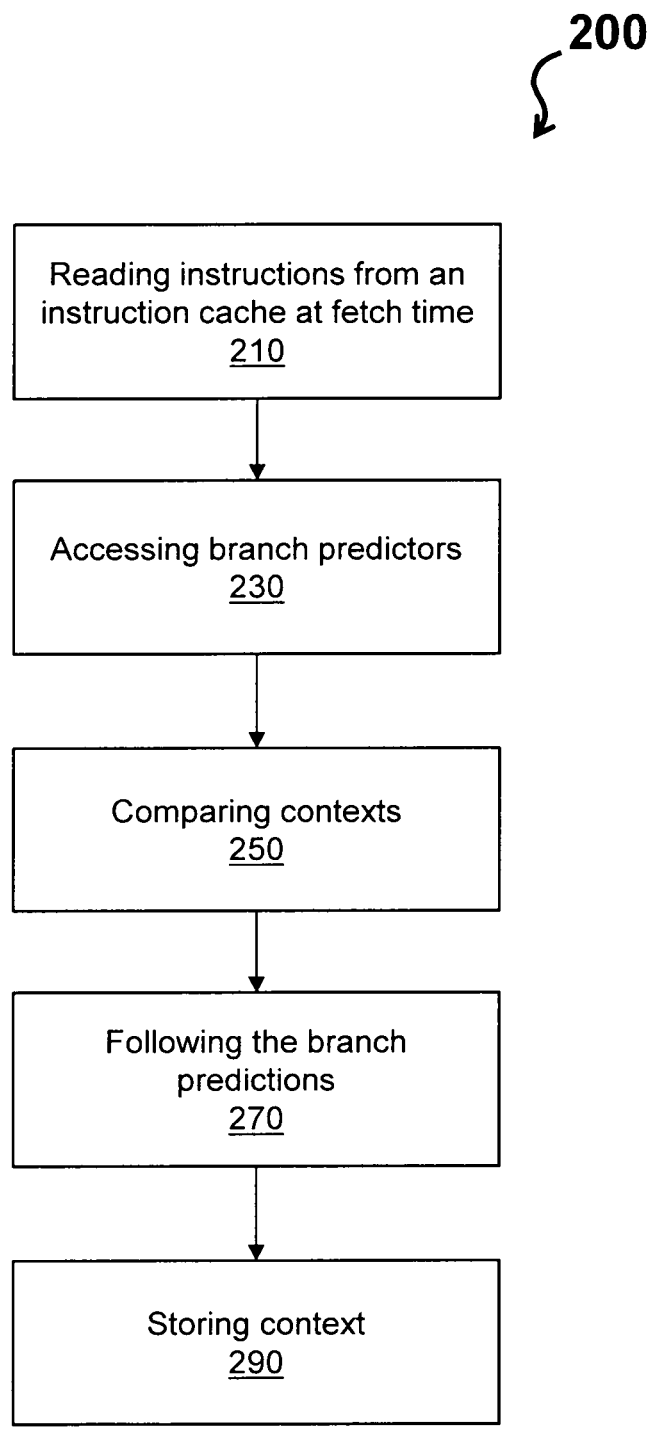
FIG. 2 depicts a process flow of a system in accordance with one or more embodiments.

FIG. 2 depicts a process flow 200 of the system 100 in accordance with one or more embodiments. The process flow 200 begins at block 210, where the processor 101 reads instructions from an instruction cache 103 at fetch time. The processor 101 further can make predictions about whether branch instructions fetched will be or will not be taken. The processor 101 can further make predictions about corresponding target addresses. Note that different prediction structures can exist for making these predictions.

At block 230, a fetcher of the processor 101 accesses branch predictors when accessing the instruction cache 103. A full fetch context is provided to the branch predictors. An index to the branch predictors can be hashed with part of the context information. At block 250, the branch predictors compare a context of prediction information against a context of a current fetch. If these contexts do not match, after providing the prediction, an indication to stop fetch is provided. The stop fetch enables the fetcher 104 to optimize for when the prediction context is correct, which is best for performance.

At block 270, the fetcher 104 follows the branch predictions. When the prediction is stop fetch, the fetcher 104 stops and waits for a flush to resume fetching. Further, the fetcher 104 invalidates any fetches that occurred based on the initial prediction provided by the branch predictors. At block 290, when the branch predictions are updated, a corresponding context for the branch instruction providing the update are stored into the branch predictions along with the prediction.

Figure 3:
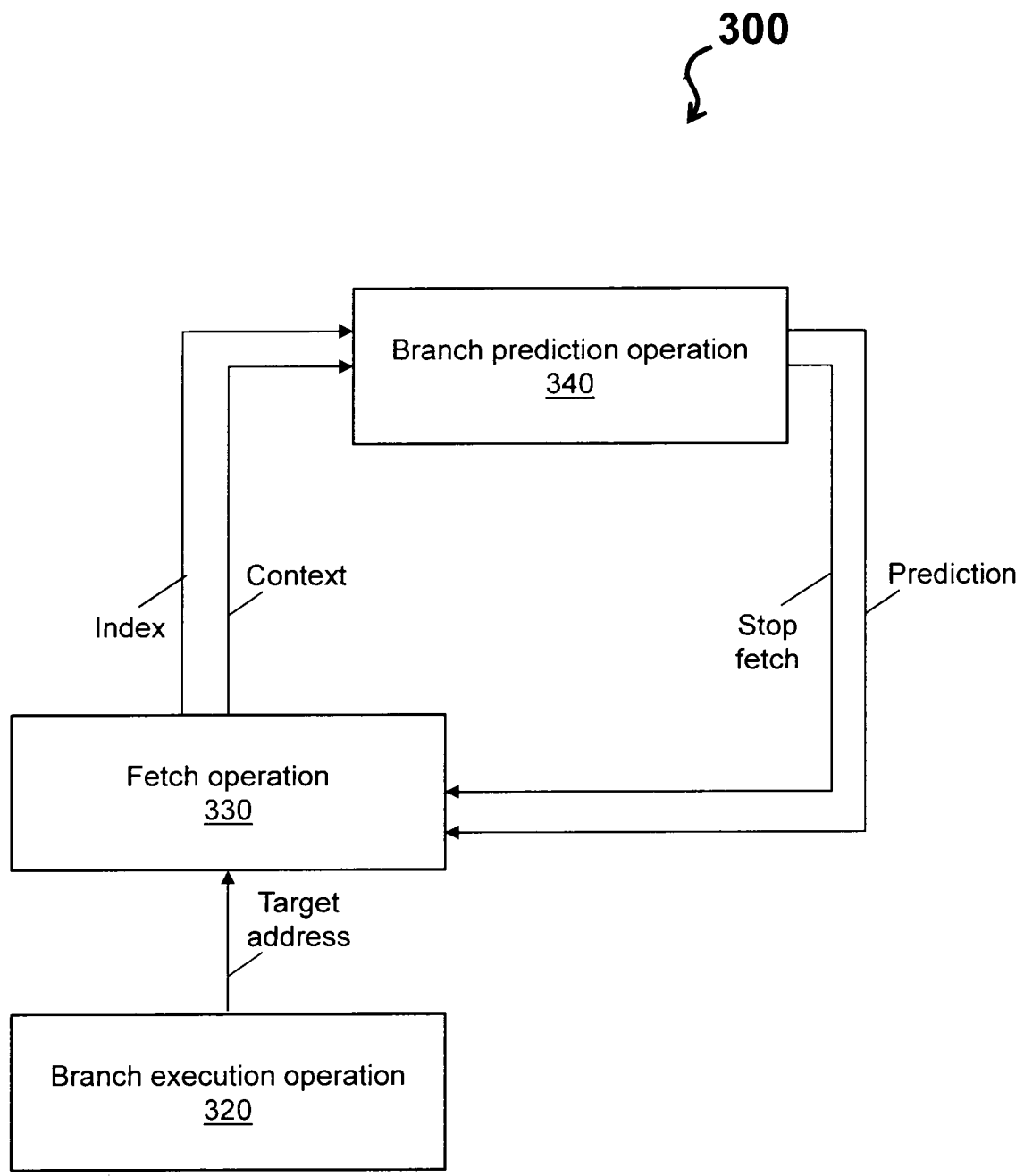
FIG. 3 depicts a flow schematic of a system in accordance with one or more embodiments.

FIG. 3 depicts a flow schematic 300 of the system 100 in accordance with one or more embodiments. The flow schematic 300 is performed in the processor 101 of FIG. 1. The flow schematic 300 depicts a branch execution operation 320. The branch execution operation 320 includes executing a branch instruction with a target address. The branch execution operation 320 drives a fetch operation 330 according to the target address.

The fetch operation 330, in turn, executes an instruction stream that inherently includes fetching instructions from the instruction cache 103. For example, internal registers enable the processor 101 to know where the processor 101 is fetching from, while internal logic supports fetching that accesses the instruction cache 103 and pull out the instruction stream. If the instruction stream includes a branch instruction (e.g., an indirect branch), then the flow schematic 300 proceeds to a branch prediction operation 340 by providing both an index and a context.

Figure 4:
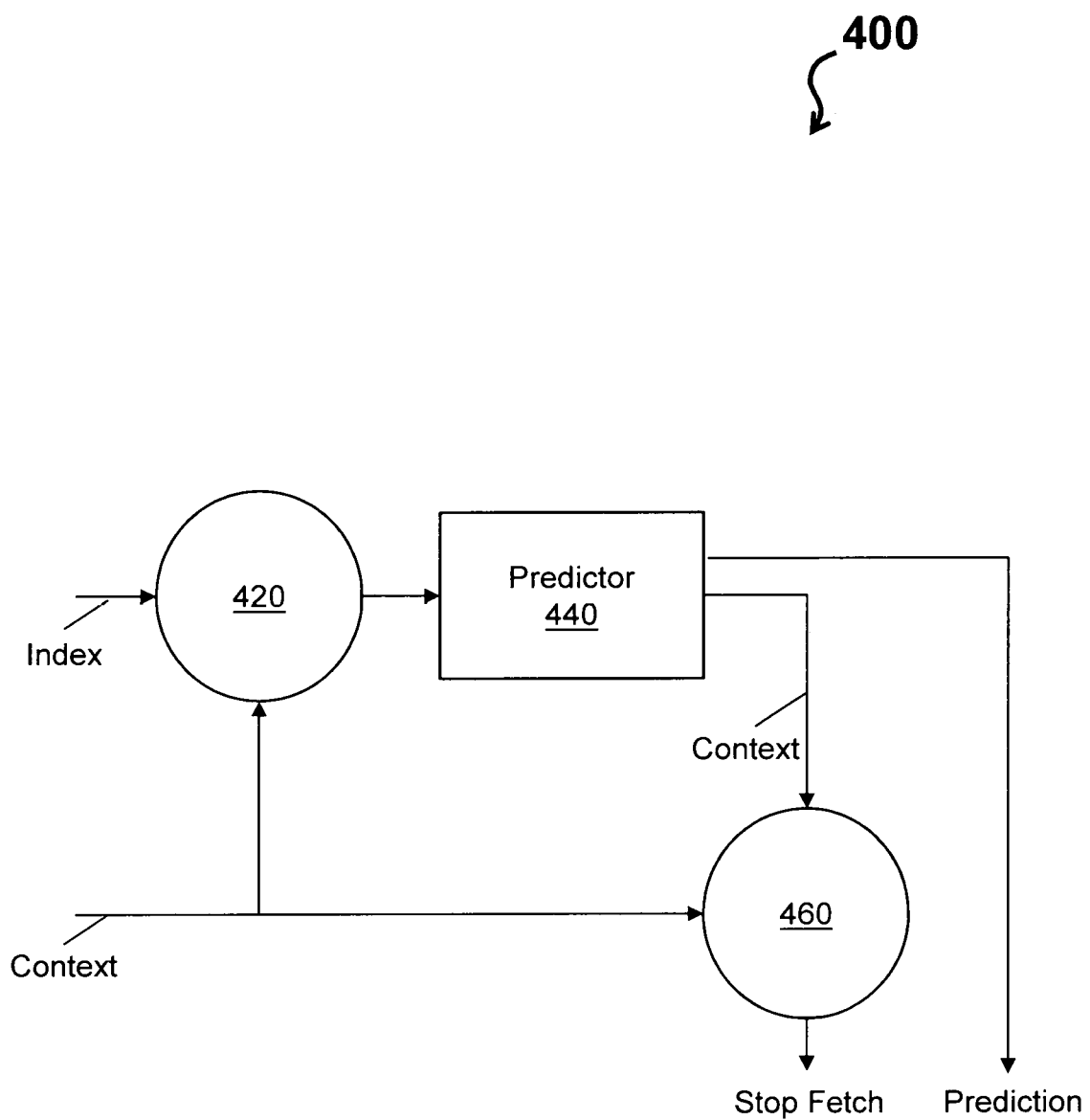
FIG. 4 depicts a flow schematic of a system in accordance with one or more embodiments.

The branch prediction operation 340 is further described with respect to FIG. 4, which depicts a flow schematic 400 of the system 100 in accordance with one or more embodiments. The flow schematic 400 is performed in the processor 101 of FIG. 1.

The flow schematic 400 hashes 420 the index and the context from the instruction stream (e.g., the fetch operation 330). The hash 420 can include an exclusive-or (e.g., XOR) or a concatenation. The hash 420 produces an index modification. Then, the index modification is passed to a predictor 440.

The predictor 440 outputs a prediction. For instance, the predictor 440 can be a branch instruction predictor (e.g., a table) that utilizes the index modification to look-up the prediction. Further, the predictor 440 outputs a context based on the prediction.

The flow schematic 400 then compares 460 the context from the predictor 440 with the context received from the instruction stream. In accordance with one or more embodiments, if these contexts are equal, then no action is taken. If these contexts are not equal, then the processor 101 issues a stop fetch.

Figure 5:
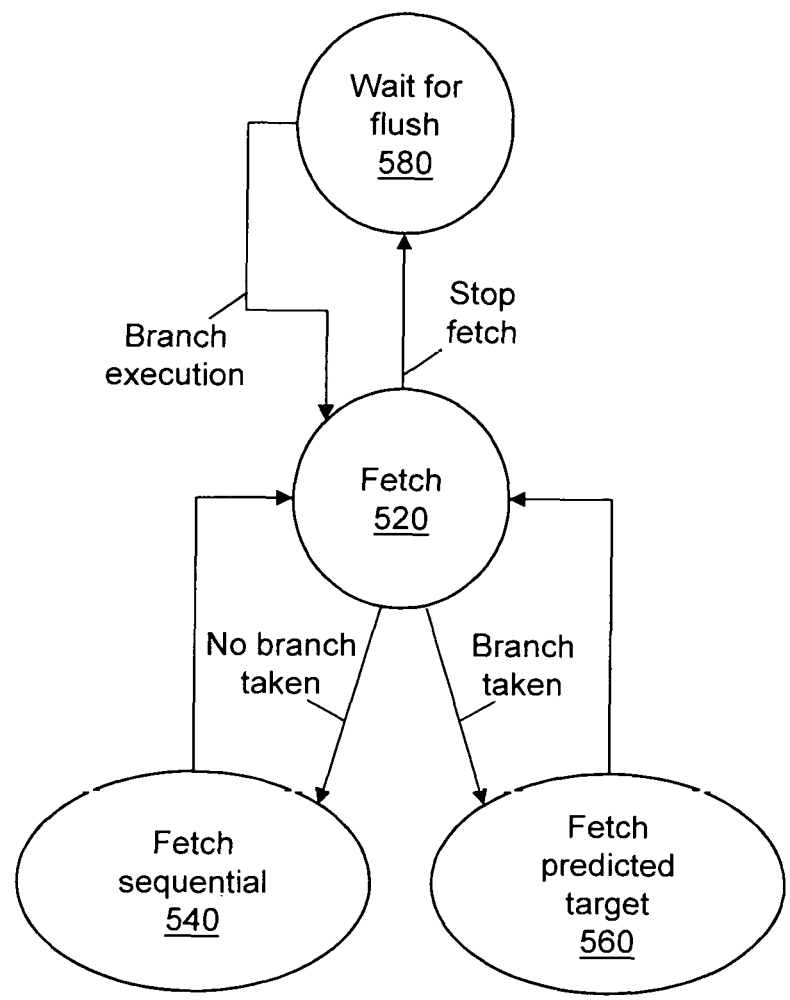
FIG. 5 depicts a flow schematic of a system in accordance with one or more embodiments.

FIG. 5 depicts a flow schematic 500 of the system 100 in accordance with one or more embodiments. The flow schematic 500 is performed in the processor 101 of FIG. 1 and further describes the fetch operation 330 of FIG. 3. The flow schematic 500 executes a fetch 520. If the no branch is taken, then the fetch is sequential 540. If the branch is taken, then a predicted target is fetched 550. If a stop fetch is issued (e.g., received from the branch prediction operation 340), then the processor 101 waits for a flush 580 and returns to the fetch 520 when a branch execution is received. Note that if a fetch of a branch instruction is itself speculative and then later flushed by some other instruction, then that flush has priority. That is, an unrelated flush should always have priority because by definition it would be older (happens earlier in the instruction stream).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
reading, by a processor, an instruction stream by fetching instructions from an instruction cache of the processor;
executing, by the processor, a branch prediction operation based on a context of the instruction stream and an index when one of the instructions includes a branch instruction, the branch prediction operation outputting a prediction and a context, the index being hashed with at least part of the context of the instruction stream to produce a modified index;
comparing, by the processor, the context of the instruction stream and the context from the branch prediction operation to determine whether to execute a stop fetch; and
issuing, by the processor, the stop fetch after waiting for a flush.

2. The processor-implemented method of claim 1, wherein the modified index is utilized during the branch prediction operation by a branch instruction predictor to look-up the prediction.

3. The processor-implemented method of claim 1, wherein the stop fetch is executed when the context of the instruction stream is not equal to the context from the branch prediction operation.

4. The processor-implemented method of claim 1, wherein the stop fetch is not executed when the context of the instruction stream is equal to the context from the branch prediction operation.

5. The processor-implemented method of claim 1, wherein the branch instruction is an indirect branch.

6. The processor-implemented method of claim 1, wherein the modified index enables the instruction stream and at least one other thread to occupy different slots in a prediction table to avoid crashing.

7. The processor-implemented method of claim 1, wherein when the stop fetch is issued, the processor waits for the flush and returns to the fetch when the branch execution is received.

8. A computer program product comprising a computer readable storage medium having program instructions embodied therewith, the program instructions executable by a processor to cause:
  reading, by the processor, an instruction stream by fetching instructions from an instruction cache of the processor;
  executing, by the processor, a branch prediction operation based on a context of the instruction stream and an index when one of the instructions includes a branch instruction, the branch prediction operation outputting a prediction and a context, the index being hashed with at least part of the context of the instruction stream to produce a modified index;
  comparing, by the processor, the context of the instruction stream and the context from the branch prediction operation to determine whether to execute a stop fetch; and
  issuing, by the processor, the stop fetch after waiting for a flush.

9. The computer program product of claim 8, wherein the modified index is utilized during the branch prediction operation by a branch instruction predictor to look-up the prediction.

10. The computer program product of claim 8, wherein the stop fetch is executed when the context of the instruction stream is not equal to the context from the branch prediction operation.

11. The computer program product of claim 8, wherein the stop fetch is not executed when the context of the instruction stream is equal to the context from the branch prediction operation.

12. The computer program product of claim 8, wherein the branch instruction is an indirect branch.

13. A system comprising a processor storing program instructions thereon, the program instructions executable by a processor to cause:
  reading, by the processor, an instruction stream by fetching instructions from an instruction cache of the processor;
  executing, by the processor, a branch prediction operation based on a context of the instruction stream and an index when one of the instructions includes a branch instruction, the branch prediction operation outputting a prediction and a context, the index being hashed with at least part of the context of the instruction stream to produce a modified index;
  comparing, by the processor, the context of the instruction stream and the context from the branch prediction operation to determine whether to execute a stop fetch; and
  issuing, by the processor, the stop fetch after waiting for a flush.

14. The system of claim 13, wherein the modified index is utilized during the branch prediction operation by a branch instruction predictor to look-up the prediction.

15. The system of claim 13, wherein the stop fetch is executed when the context of the instruction stream is not equal to the context from the branch prediction operation.

16. The system of claim 13, wherein the stop fetch is not executed when the context of the instruction stream is equal to the context from the branch prediction operation.

17. The system of claim 13, wherein the branch instruction is an indirect branch.

* * * * *